(12) United States Patent
Sandusky (10) Patent No.: US 7,995,191 B1
(45) Date of Patent: Aug. 9, 2011

(54) SCANNERLESS LASER RANGE IMAGING USING LOSS MODULATION

(75) Inventor: John V. Sandusky, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 875 days.

(21) Appl. No.: 11/477,248

(22) Filed: Jun. 29, 2006

(51) Int. Cl.
*G01C 3/08* (2006.01)
(52) U.S. Cl. .................. 356/5.14; 356/5.01; 356/5.04
(58) Field of Classification Search ................. 356/5.1, 356/3–5.15
See application file for complete search history.

(56) References Cited

U.S. PATENT DOCUMENTS

| | | | |
|---|---|---|---|
| 4,935,616 A * | 6/1990 | Scott | 250/214 VT |
| 4,957,362 A * | 9/1990 | Peterson | 356/5.14 |
| 5,056,914 A * | 10/1991 | Kollodge | 356/5.05 |
| 5,056,941 A * | 10/1991 | Kato et al. | 400/124.12 |
| 5,162,861 A * | 11/1992 | Tamburino et al. | 356/5.05 |
| 5,877,851 A | 3/1999 | Stann et al. | |
| 6,088,086 A | 7/2000 | Muguira et al. | |
| 6,448,572 B1* | 9/2002 | Tennant et al. | 250/559.38 |
| 6,584,283 B2* | 6/2003 | Gabello et al. | 396/109 |
| 6,707,054 B2* | 3/2004 | Ray | 250/559.38 |
| 2001/0052979 A1* | 12/2001 | Treado et al. | 356/326 |
| 2004/0036851 A1* | 2/2004 | Hunter et al. | 356/5.01 |
| 2004/0262499 A1* | 12/2004 | Martinelli et al. | 250/225 |
| 2006/0227316 A1* | 10/2006 | Gatt | 356/5.09 |

OTHER PUBLICATIONS

R. W. Lee, "The Linear Electrooptic (Pockels) Effect in Cubic Crystals; Wide Angle Light Intensity Modulation" Applied Optics, vol. 8, No. 7, 1969, pp. 1385-1392.

Edward A. West, "Extending the field of view of KD*P electrooptic modulators", Applied Optics, vol. 17, No. 18, Sep. 1978, pp. 3010-3013.

John P. Anthes, et al, "Non-scanned LADAR imaging and applications", SPIE vol. 1936 Applied Laser Radar Technology (1993), pp. 11-22.

Phil Garcia et al, "Characterization of a Scannerless RADAR System", SPIE vol. 1936 Applied Laser Radar Technology (1993), pp. 23-30.

J. S. Major, Jr. et al, "8.5W CW 2.0 μm InGaAsP laser diodes," Electronics Letters, Nov. 1993, vol. 29, No. 24, pp. 2112-2113.

D. Garbuzov, et al, "1.5 μm wavelength, SCH-MQW InGaAsP/InP broadened-waveguide laser diodes with low internal loss and high output power," Electronics Letters, vol. 32, No. 18, 1996, pp. 1717-1719.

R. L. Schmitt, et al, "High-Frequency Scannerless Imaging Laser Radar for Industrial Inspection and Measurement Applications," Sandia Report, SAND96-2739, Nov. 1996.

(Continued)

*Primary Examiner* — Thomas H Tarcza
*Assistant Examiner* — Timothy A Brainard
(74) *Attorney, Agent, or Firm* — Oliva J. Tsai (57) ABSTRACT

A scannerless 3-D imaging apparatus is disclosed which utilizes an amplitude modulated cw light source to illuminate a field of view containing a target of interest. Backscattered light from the target is passed through one or more loss modulators which are modulated at the same frequency as the light source, but with a phase delay δ which can be fixed or variable. The backscattered light is demodulated by the loss modulator and detected with a CCD, CMOS or focal plane array (FPA) detector to construct a 3-D image of the target. The scannerless 3-D imaging apparatus, which can operate in the eye-safe wavelength region 1.4-1.7 μm and which can be constructed as a flash LADAR, has applications for vehicle collision avoidance, autonomous rendezvous and docking, robotic vision, industrial inspection and measurement, 3-D cameras, and facial recognition.

21 Claims, 3 Drawing Sheets

OTHER PUBLICATIONS

P.J. Williams et al, "Tapered laser arrays for high power operation (>1.4W CW) at 1.59 μm for applications in surgery," Electronics Letters, vol. 34, No. 10, May 1998, pp. 993-994.

Stuart A. Taylor et al, "CCD and CMOS Imaging Array Technologies: Technology Review," Technical Report EPC-1998-106, Xerox Research Centre Europe.

P. Salet et al, "1.1-W Continuous-Wave 1480-nm Semiconductor Lasers with Distributed Electrodes for Mode Shaping", IEEE Photonics Technology Letters, vol. 10, No. 12, Dec. 1998, pp. 1706-1708.

Heinrich Hofler et al, "3D-profiling by optical demodulation with an image intensifier", Part of the IS&T/SPIE Conference on Three-Dimensional Image Capture and Applications II, San Jose, CA, Jan. 1999, pp. 21-27.

Martin H. Ettenbert et al, "A Room Temperature 640×512 Pixel Near-Infrared InGaAs Focal Plane Array", Proceedings of SPIE vol. 4028 (2000), pp. 201-207.

H.-G.Treusch et al, "High-Brightness Semiconductor Laser Sources for Materials Processing: Stacking, Beam Shaping, and Bars", IEEE Journal of Selected Topics in Quantum Electronics, vol. 6 No. 4, Jul./Aug. 2000, pp. 601-614.

Ulrich Schael et al, "Field measurements with 1574nm imaging, scannerless, eye-safe laser radar", Proceedings of SPIE vol. 4377 (2001) pp. 1-11.

Jose N. Pecina, "Unmanned Navigation with a Novel Laser and a Smart Software", IEEEAC paper #1003, vol. 1-305, Updated Nov. 9, 2002, pp. 1-8.

Pierre Magnan, "Detection of visible photons in CCD and CMOS: A comparative view", Nuclear Instruments and Methods in Physics Research A 504 (2003) pp. 199-212.

Ulrich Schael et al, "Advanced simulation of eye-safe, imaging laser radar for range estimation, system comparison and design process," Proceedings of SPIE vol. 5144 (2003) pp. 333-342.

R. M. Lammert, et al, "Advances in high brightness high power semiconductor lasers," Proceedings of SPIE vol. 6216, 62160B (2006) pp. 1-12.

Charles J. Peters, "Gigacycle-Bandwith Coherent-Light Traveling-Wave Amplitude Modulator," Proceedings of the IEEE, vol. 53, May 1965, pp. 455-460.

John W. Evans, "The Birefringent Filter," Journal of the Optical Society of America, vol. 39, No. 3, Mar. 1949, pp. 229-242.

* cited by examiner

SCANNERLESS LASER RANGE IMAGING USING LOSS MODULATION

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates in general to laser ranging and detection (ladar), and in particular to a scannerless laser range imaging apparatus having a receiver which utilizes loss modulation to construct a three-dimensional (3-D) image of a target within a field of view of the apparatus.

BACKGROUND OF THE INVENTION

Previous scannerless laser ranging systems which operate with an amplitude-modulated continuous-wave (CW) laser source have generally utilized an image intensifier tube in the receiver (see e.g. U.S. Pat. Nos. 4,935,616 and 6,088,086 which are incorporated herein by reference). The image intensifier tube limits operation of these systems to the visible region and wavelengths below about one micron so that the prior scannerless laser ranging systems are generally not eye-safe for people in the field of view. Additionally, the image intensifier tube in these systems has a poor resolution of target features; and the image produced by the image intensifier tube is subject to blooming in the presence of a relatively high intensity of incident light (e.g. due to a glint from the target or elsewhere) which can further degrade the resolution. The temporal responsivity of the image intensifier tube is also limited by a relatively slow phosphor decay time.

The present invention overcomes the limitations of the prior art by providing a scannerless 3-D imaging apparatus which utilizes a variable attenuator in the form of a loss modulator in place of the conventionally-used image intensifier tube. The use of the loss modulator allows optical imaging directly onto an array detector, thereby providing a sharper image of the target and eliminating blooming which occurs in prior art devices based on image intensifier tubes. The loss modulator also extends the wavelength range over which the scannerless 3-D imaging apparatus of the present invention can be used so that operation at eye-safe wavelengths (e.g. 1.4-1.7 μm) is possible. This allows the possibility for new applications where concerns about exposure to laser radiation are paramount, including vehicle collision avoidance, autonomous rendezvous and docking, robotic vision, industrial inspection and measurement, 3-D cameras, and facial recognition.

These and other advantages of the present invention will become evident to those skilled in the art.

SUMMARY OF THE INVENTION

The present invention relates to a scannerless three-dimensional (3-D) imaging apparatus which can be used to provide a 3-D image of a target within a field of view. The scannerless 3-D imaging apparatus comprises a continuously-emitting light source which is amplitude modulated in response to a first sinusoidal modulation signal at a frequency $f_0$ to provide a non-scanned illumination of the field of view; a loss modulator which is modulated at the same frequency $f_0$ in response to a second sinusoidal modulation signal having a variable phase delay with respect to the first sinusoidal modulation signal, with the loss modulator being adapted to receive light backscattered from the target within the field of view and to provide a loss in transmission through the loss modulator which is range dependent and phase-delay dependent; and an array detector to detect the backscattered light transmitted through the loss modulator and generate therefrom an electrical output signal containing information wherefrom the 3-D image of the target can be constructed. The frequency $f_0$ can be, for example, in a range of 1 MHz to 10 GHz.

The continuously-emitting light source can comprise a laser (e.g. a semiconductor laser, a fiber laser, or a solid-state laser). In some embodiments of the present invention, the illumination from the laser can be in an eye-safe wavelength region between 1.4 microns and 1.7 microns.

The loss modulator can comprise a pair of crossed linear polarizers sandwiched about an electrooptic crystal modulator, and can further include a quarter-wave plate located between the pair of crossed linear polarizers. The electrooptic crystal modulator can comprise an electrooptic crystal selected from the group consisting of lithium niobate ($LiNbO_3$), lithium tantalate ($LiTaO_3$), barium titanate ($BaTiO_3$), beta barium borate ($\beta$-$BaB_2O_4$), potassium dihydrogen phosphate (KDP), potassium titanyl phosphate (KTP), potassium niobate ($KNbO_3$), zinc selenide (ZnSe), gallium arsenide (GaAs), BGO ($Bi_{12}GeO_{20}$), and BSO ($Bi_{12}SiO_{20}$). An aperture stop can also be included in the apparatus to limit the amount of the backscattered light received into the loss modulator.

The detector can comprise either a focal plane array (FPA) detector, a charge-coupled device (CCD) array detector, or a complementary metal-oxide semiconductor (CMOS) array detector. The FPA detector can comprise, for example, an indium gallium arsenide FPA detector for use in the 1.4-1.7 μm eye-safe wavelength region. Alternately, a silicon CCD or CMOS array detector can be used for operation of the apparatus at wavelengths below about 1.1 μm.

The present invention also relates to a scannerless 3-D imaging apparatus to which comprises a continuously-emitting light source which is amplitude modulated in response to a sinusoidal modulation signal at a frequency $f_0$ to provide a non-scanned illumination of the field of view for a period of time; a plurality of loss modulators which are each modulated at the same frequency $f_0$ with a different phase delay $\delta_i$ with respect to the sinusoidal modulation signal, with each loss modulator being adapted to receive a portion of backscattered light from the target and to provide a loss in transmission of that portion of the backscattered light which is dependent on a range to the target and also dependent on the phase-delay $\delta_i$; and an array detector to detect the portion of the backscattered light transmitted through each loss modulator and to generate therefrom an electrical output signal containing information wherefrom the 3-D image of the target can be constructed. This embodiment of the present invention, which allows detection of a 3-D image in a single short-duration illumination from the light source is also referred to herein as a flash LADAR.

The light source can comprise a laser (e.g. a semiconductor laser). In certain embodiments of the present invention, the laser can operate in an eye-safe wavelength region in the range 1.4-1.7 microns.

Each loss modulator can comprise a pair of crossed linear polarizers sandwiched about an electrooptic crystal modulator, and can further include a quarter-wave plate between the pair of crossed linear polarizers. Each array detector can comprise a CCD, CMOS or FPA array detector.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
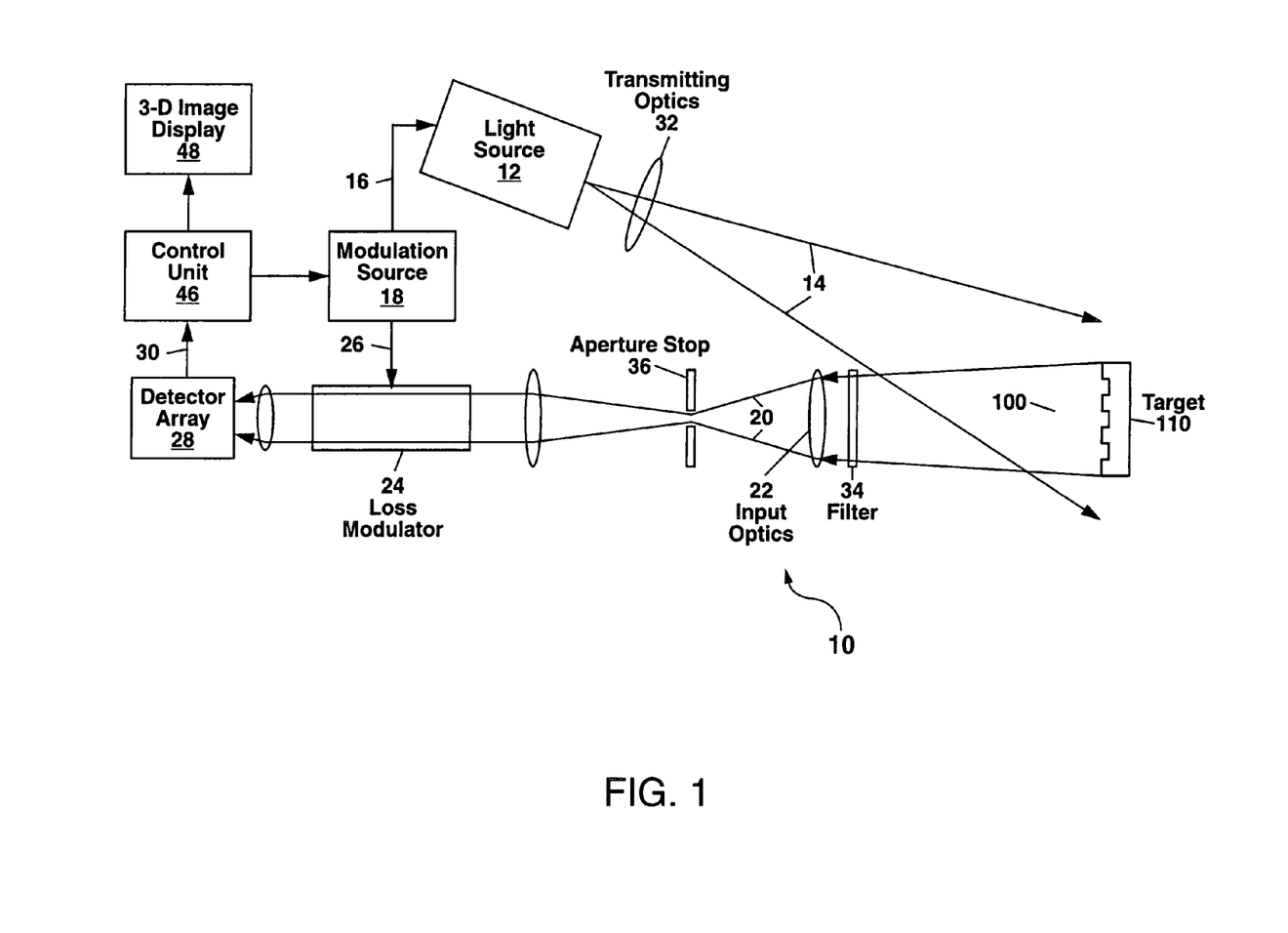
FIG. 1 shows a schematic diagram of a first example of the scannerless 3-D imaging apparatus of the present invention.

Referring to FIG. 1, there is shown a first example of the scannerless 3-D imaging apparatus 10 of the present invention. The apparatus 10 comprises a continuously-emitting (also termed continuous-wave or cw) light source 12 which emits a light beam 14 to provide a non-scanned illumination of a field of view 100.

The terms "continuously-emitting," "continuous-wave" and "cw" as used herein refer to a light source 12 which emits light over a time scale which is measured in units of microseconds to seconds or longer, and is to be distinguished from a pulsed light source which emits light in pulses with the duration of each light pulse being much smaller than one microsecond, and generally on the order of ten nanoseconds or less. A "continuously-emitting" light source 12 as this term is used herein can also refer to a light source 12 in which the emitted light is modulated at a frequency $f_o$ with each modulation cycle of the emitted light having substantially the same peak amplitude.

In FIG. 1, the light beam 14 is sinusoidally amplitude modulated at a frequency $f_o$ in response to a sinusoidal modulation signal 16 provided by a modulation source 18. A portion of the light backscattered from a target 110 of interest within the field of view 100 can be collected and processed to form a 3-D image of the target 110. This can be done by collecting the backscattered light 20 with input optics 22 and directing the backscattered light 20 through a loss modulator 24. The loss modulator 24 is modulated at the frequency $f_o$ by another sinusoidal modulation signal 26 in which a phase delay δ can be varied with respect to the phase of the modulation signal 16.

By measuring a round-trip phase shift φ between the light beam 14 from the source 12 and the backscattered light 20 at the loss modulator 24, the range R to the target 110 can be calculated from $$R = \frac{c\phi}{4\pi f_0}$$

where c is the speed of light, φ is the round-trip phase shift, and $f_o$ is the modulation frequency. Differences in range to different features on the target 110 will result in a different round-trip phase shift φ which can be used to produce a spatially varying transmission loss through the loss modulator 24 so that the intensity of the backscattered light 20 reaching each element of a two-dimensional (2-D) array detector 28 will be proportional to the round-trip phase shift φ and can be used to calculate the range to each feature on the target 110 imaged by that detector element. Each detector element thus generates an electrical output signal 30 which contains information that can be used to generate a 3-D image of the target 110.

The electrical output signal 30 for each individual detector element (i.e. pixel) in the 2-D array detector 28 is proportional to the intensity of the backscattered light 20 detected, and is given by an equation of the form $$I = A + B \cos(\phi + \delta)$$

where A is an offset constant, B depends on the intensity of the illumination light beam 14, a $1/R^2$ range factor, the target albedo, an overall transmission loss from the input optics 22 to the detector 28 and a depth of modulation due to optical mixing in the loss modulator 24; φ is the round-trip phase shift for each pixel; and δ is a phase delay in the phase of the sinusoidal modulation signal 26 provided to the loss modulator 24 relative to the phase of the sinusoidal modulation signal 16 provided to modulation signal 16 provided to amplitude modulate the light beam 14. Since there are three unknowns A, B, and φ in the above equation, then at least three separate images can be detected with the apparatus 10 for different values of the phase delay δ to solve for these three unknowns. The values of the phase delay δ can be given by $$\delta_i = i\frac{2\pi}{N}$$

where i=1, 2 ... N and N is the total number of separate images which are to be detected by the apparatus 10 to construct the 3-D image of the target 110.

The above analysis for the scannerless 3-D imaging apparatus 10 of the present invention is similar to that for conventional range imaging radars which are based on the use of an image intensifier tube in which the gain is modulated. However, gain modulation and loss modulation are exactly the opposite of each other in that gain modulation produces an increase in detected signal intensity; whereas loss modulation produces a decrease in detected signal intensity. Further details of the analysis for conventional image intensifier tube type range imaging radars can be found in U.S. Pat. Nos. 4,935,626 and 6,088,086 and also in a report by R. L. Schmitt, et al., *High-Frequency Scannerless Imaging Laser Radar for Industrial Inspection and Measurement Applications*, Sandia National Laboratories Report No. SAND96-2739 (November 1996) (available from National Technical Information Service, US Department of Commerce, Springfield, Va.).

The apparatus 10 of the present invention provides certain advantages over conventional image intensifier tube based systems in terms of increased image resolution due to the backscattered light 20 being imaged through the loss modulator 24 to the detector array 28. Additionally, the present invention is advantageous since it eliminates the blooming associated with image intensifier tubes which degraded the resolution further as glints (i.e. areas of intense light scattering from the target) were incident on the photocathode of the image intensifier tubes. Furthermore, the apparatus 10 of the present invention provides advantages in extending operation to wavelengths beyond one micron including the important eye-safe wavelength region of 1.4-1.7 µm where the ocular fluid in the eye is highly absorbing and thereby prevents exposure of the sensitive retina to potentially damaging laser radiation.

Returning to FIG. 1, the light source 12 can comprise a laser. Of particular interest for short-range (≦100 meters) applications is the use of a semiconductor laser (also termed a diode laser) which can be directly amplitude modulated by biasing the semiconductor laser at an direct current (d.c.) operating point above a lasing threshold, with the sinusoidal modulation signal 16 applied through a bias tee to amplitude modulate the lasing output of the semiconductor laser 12. The modulation depth of the light beam 14 from the source 12 can be up to 100 percent.

Semiconductor lasers are commercially available at different wavelengths in the visible and near-infrared with cw output powers of tens to hundreds of Watts. Such semiconductor lasers are based on III-V compound semiconductors including AlGaAs, InGaAs, InGaAsP and InGaN. These high-power semiconductor lasers generally emit light in the range 0.8-2.0 µm. Those skilled in the art will understand that yet other semiconductor alloy compositions are available to emit light at other wavelengths. The exact type of semiconductor laser required for each embodiment of the present invention will depend upon several factors including the required detection range (generally about 1-200 meters) and field of view 100 of the apparatus 10, the type of array detector 28 used, and whether the apparatus 10 must be eye-safe or not. As an example, when the apparatus 10 is used for eye-safe applications an InGaAsP semiconductor laser operating in the wavelength range of 1.4-1.7 µm can be used.

The term "semiconductor laser" as used herein in intended to include devices 12 having a single lasing aperture (i.e. single-stripe or broad-area semiconductor diode lasers) as well as devices 12 having multiple lasing apertures arranged in one or two dimensions (i.e. semiconductor diode laser arrays, or bars which include a plurality of spaced-apart single-stripe, broad-area, or diode laser arrays, or a plurality of stacked bars).

Other types of lasers can also be used for the light source 12 in the apparatus, including fiber lasers and solid-state lasers (e.g. Nd:YAG) which are well-known in the art and which can utilize semiconductor diode laser pumping for cw operation. Sinusoidal amplitude modulation of these alternative types of lasers can be performed by directing the output beam 14 of the fiber or solid-state laser through another loss modulator 24 (not shown) prior to directing the beam 14 through transmitting optics 32 to illuminate the field of view 100. Additional optics can be provided to collimate the light beam 14 prior to directing the light beam through the additional loss modulator 24.

In other embodiments of the present invention, the light source 12 can be a lamp (e.g. a xenon arc lamp), or a light-emitting diode (LED). The lamp or LED can be sinusoidally modulated, for example, with another loss modulator 24 as described above. With a LED light source 12, the modulation can also be performed electrically by biasing the LED 12 at a predetermined d.c. operating point and applying an additional sinusoidally modulated current to the LED 12.

In FIG. 1, the light source 12 is amplitude modulated using a sinusoidal modulation signal 16 provided by the modulation source 18. The modulation source 18 can comprise a conventional sine wave generator or function generator which provides an output signal at a frequency which is generally in the range of 1 MHz to 10 GHz. The output signal from the modulation source 18 can be split to form the two sinusoidal modulation signals 16 and 26. Additionally, these signals can be amplified to match the particular operating voltage and current requirements for the light source 12 and the loss modulator 24. The light source 12 will generally require a low voltage (e.g. a few Volts) and a high current (several Amps or more) for the modulation signal 16 when a semiconductor laser or LED is used; whereas the loss modulator 24 will require a low current (on the order of 0.1 Amp or less) and high voltage (up to 1000 Volts or more).

In the example of FIG. 1, the transmitting optics 32 located in the path of the light beam 14 provides illumination of the field of view 100 of the apparatus 10. The transmitting optics 32 can comprise one or more lenses or mirrors, or a telescope depending upon an expected range to the target 110. In some cases, when the target 110 is at close range, the transmitting optics 32 may not be necessary due to the divergence of the light beam 14 from the source 12.

Although the light source 12 in the example of FIG. 1 provides a light beam 14 which is not coaxial with the backscattered light 20, in other embodiments of the present invention, the light beam 14 can be made coaxial with the backscattered light 20 (e.g. with a mirror or polarization beamsplitter). Such a coaxial arrangement can allow the input optics 22 to be used in a dual pass configuration to direct the light beam 14 from the source 12 outward to illuminate the field of view 100 and target 110, and also to collect the backscattered light 20 from the target 110. This can eliminate the need for separate transmitting optics 32.

In the scannerless 3-D imaging apparatus 10, an optical filter 34 can be optionally used in the path of the backscattered light 20 to filter out background light at wavelengths other than the emission wavelength of the light source 12. This can be advantageous for daylight operation. The filter 34 can be, for example, a narrow-band interference filter having a pass band centered about the emission wavelength of the source 12, or a color glass filter that passes the light from the source 12 while blocking light at other wavelengths.

An aperture stop 36 (also termed a field stop) can also be provided in the path of the backscattered light 20 to further define the field of view 100 and depth of view of the apparatus 10 as illustrated in FIG. 1. The aperture stop 36 also limits the lateral dimensions of the backscattered light 20 in the loss modulator 24 to prevent overfilling the loss modulator 24 which might otherwise produce spurious reflections of the backscattered light 20 off the sides of an electrooptic crystal 38 (see FIG. 2) in the loss modulator 24.

Details of the loss modulator 24 will now be described with reference to FIG. 2. The loss modulator 24 comprises a pair of crossed linear polarizers 40 and 40' sandwiched about an electrooptic crystal 38 (also termed an electrooptic crystal modulator). The linear polarizers 40 and 40' transmit light which is linear polarized along a polarization axis of each polarizer, and block the transmission of light at other polarization states. When the linear polarizers 40 and 40' are aligned with their polarization axes orthogonal to each other (i.e. crossed), then very little, if any, of the backscattered light 20 will be transmitted through the pair of crossed polarizers 40 and 40' unless the polarization of the backscattered light 20 is rotated between the polarizers 40 and 40'.

Figure 2:
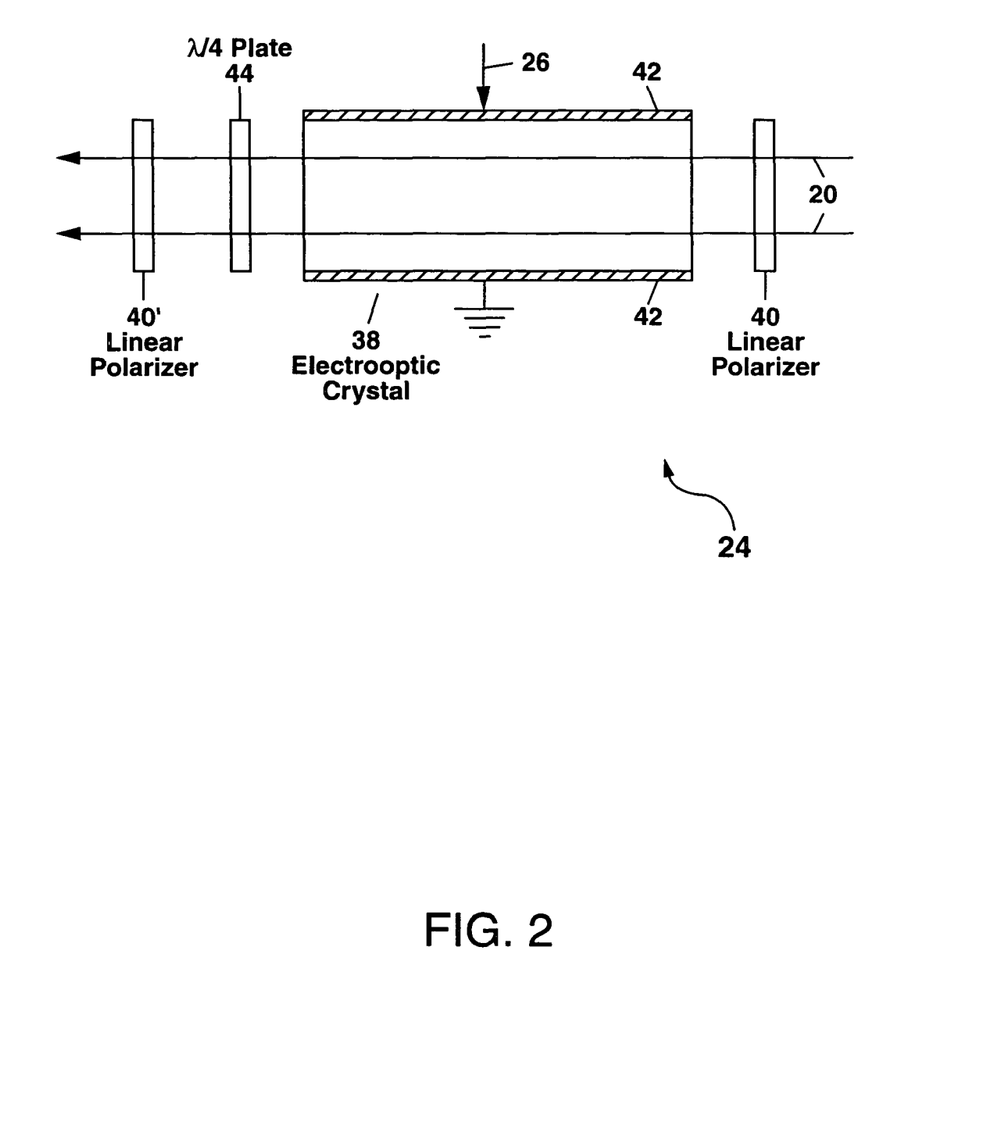
FIG. 2 shows details of the loss modulator in FIG. 1.

The electrooptic crystal 38 is located between the crossed linear polarizers 40 and 40' in FIG. 2 and acts to rotate the polarization of the backscattered light 20 by an amount which depends on the magnitude of a voltage applied across a pair of electrodes 42 located on opposite surfaces of the crystal 38. This occurs via an electrically induced birefringence in the electrooptic crystal 38. The electrooptic crystal 38 can comprise, for example, a lithium niobate (LiNbO$_3$) crystal or a lithium tantalate (LiTaO$_3$) crystal. Both of these types of crystals 38 can be used over the wavelength range 0.8-2.5 μm. The size of these electrooptic crystals 38 can be, for example, 9 millimeters on a side and 2 centimeters long. In other embodiments of the present invention, other types of electrooptic crystals 38 can be used including barium titanate (BaTiO$_3$), beta barium borate (β-BaB$_2$O$_4$), potassium dihydrogen phosphate (KDP), potassium titanyl phosphate (KTP), potassium niobate (KNbO$_3$), zinc selenide (ZnSe), gallium arsenide (GaAs), BGO (Bi$_{12}$GeO$_{20}$) and BSO (Bi$_{12}$SiO$_{20}$) for use at other wavelengths from the ultraviolet to the near infrared regions of the spectrum. Each of the above crystals 38 is available commercially.

A quarter-wave (λ/4) plate 44 can also be located between the crossed polarizers 40 and 40' to provide an additional fixed rotation of the polarization of the backscattered light 20 to provide an overall approximately 50 percent transmission of the light 20 in the absence of any applied voltage to the electrooptic crystal 38. In some instances the electrooptic crystal 38 can comprise a composite crystal formed from two equal-length electrooptic crystals of the same type with one or more half-wave plates being located therebetween (see e.g. J. W. Evans, "The Birefringent Filter," *Journal of the Optical Society of America*, vol. 39, pp. 229-242, 1949; and C. W. Peters, "Gigacycle-Bandwidth Coherent-Light Traveling-Wave Amplitude Modulator," *Proceedings of the IEEE*, vol. 53, pp. 455-460, May 1965, both of which are incorporated herein by reference). This composite crystal can provide an improved temperature stability, an improved polarization rotation through the crystal 38, and a larger field of view through the electrooptic crystal 38.

When the sinusoidal modulation signal 26 is applied across the electrooptic crystal 38, any light entering the loss modulator 24 will have its polarization modulated approximately sinusoidally, and this will produce an approximately sinusoidal amplitude modulation in the backscattered light 20 that exits the loss modulator 24. Since the backscattered light 20 is already amplitude modulated when it enters into the loss modulator 24, the result is that the backscattered light 20 exiting the loss modulator 24 will be demodulated to provide a d.c. light level at each pixel of the 2-D detector array 28. The exact d.c. light level for each pixel of the detector array 28 will depend on the phase difference between the amplitude modulated light 20 entering into the loss modulator 24 and the sinusoidal modulation signal 26 driving the loss modulator 24. The spatial variations in the detected backscattered light 20 exiting the loss modulator 24 provide information that can be used to generate a 3-D image of the target 110 as previously described.

The 2-D array detector 28 can be an integrating detector such as a charge-coupled device (CCD) detector, a complementary metal-oxide semiconductor (CMOS) detector or a focal-plane array (FPA) detector as known to the art (see e.g. S. A. Taylor, *CCD and CMOS Imaging Array Technologies: Technology Review*, Xerox Research Centre Europe Technical Report No. EPC-1998-106, 1998; P. Magnan, "Detection of Visible Photons in CCD and CMOS: A Comparative View," *Nuclear Instrumentation and Methods in Physics Research A*, vol. 504, pp. 199-212, 2003). Such array detectors 28, which are commercially available, comprise a 2-D array of individual detector elements (i.e. pixels) which can integrate the d.c. backscattered light 20 incident on each pixel for a predetermined period of time to generate an electrical output signal from that pixel. These devices 28 can also operate at a video rate (e.g. 30 Hz) to provide a 2-D image of the target 110 in the absence of any sinusoidal modulation signal 26 to the loss modulator 24. This 2-D image of the target 110 can be stored in the control unit 46 and then superimposed upon the 3-D image of the target 110 by the apparatus 10.

Silicon CCDs and CMOS array detectors can detect light at wavelengths below about 1.1 μm; whereas InGaAs FPAs can detect light at wavelengths in the range 0.9-1.7 μm which includes the eye-safe region from 1.4 to 1.7 μm. At longer wavelengths, an indium antimonide (InSb) or mercury cadmium telluride (HgCdTe) FPA detector array 28 can be used in the apparatus 10.

The exact number of pixels in the 2-D array detector 28 will depend upon the desired resolution of the apparatus 10 and can range, for example, from 128×128 to 640×512 or more. Generally, the pixel size (e.g. 4-9 μm) of commercially available silicon CCD and CMOS array detectors is smaller than that of InGaAs FPA detectors (e.g. 25-30 μm) due to the larger market (e.g. for digital cameras) and more mature manufacturing technology for the silicon CCD and CMOS array detectors.

In FIG. 1, the electrical output signal 30 from the 2-D array detector 28 can be fed into a control unit 46, which can comprise a computer, and used to construct the 3-D image of the target 110. This can be done by obtaining N different images of the target 110 with different phase delays $\delta_i$ given by $$\delta_i = i\frac{2\pi}{N}$$

where i=1, 2 ... N as previously described in order to solve the equation:

$$I = A + B\cos(\phi + \delta)$$

and calculate the round-trip phase shift $\phi$ for each pixel and thereby calculate the range to the corresponding features in the target 110 responsible for the backscattered light 20 detected by that pixel in the 2-D detector array 28. The time required for obtaining each image in the apparatus 10 can range from about 30 milliseconds to a few seconds or more depending upon the amount of backscattered light 20 detected and whether signal averaging over repeated measurements is used to enhance image resolution.

The control unit 46 can then provide the 3-D image to a display 48, with the 3-D image being optionally overlaid on a 2-D image of the target 110 generated from the detector array 28 without any modulation signal 26 to the loss modulator 24. Topographical features of the target 110 can be displayed as variations in intensity or color in the 3-D image. The constructed 3-D image of the target 110 can also be compared with an image stored in memory. This can be done, for example, for inspection and measurement of parts 110 on an assembly line, for guiding a robotic vehicle along a predetermined path, or for facial recognition.

Figure 3:
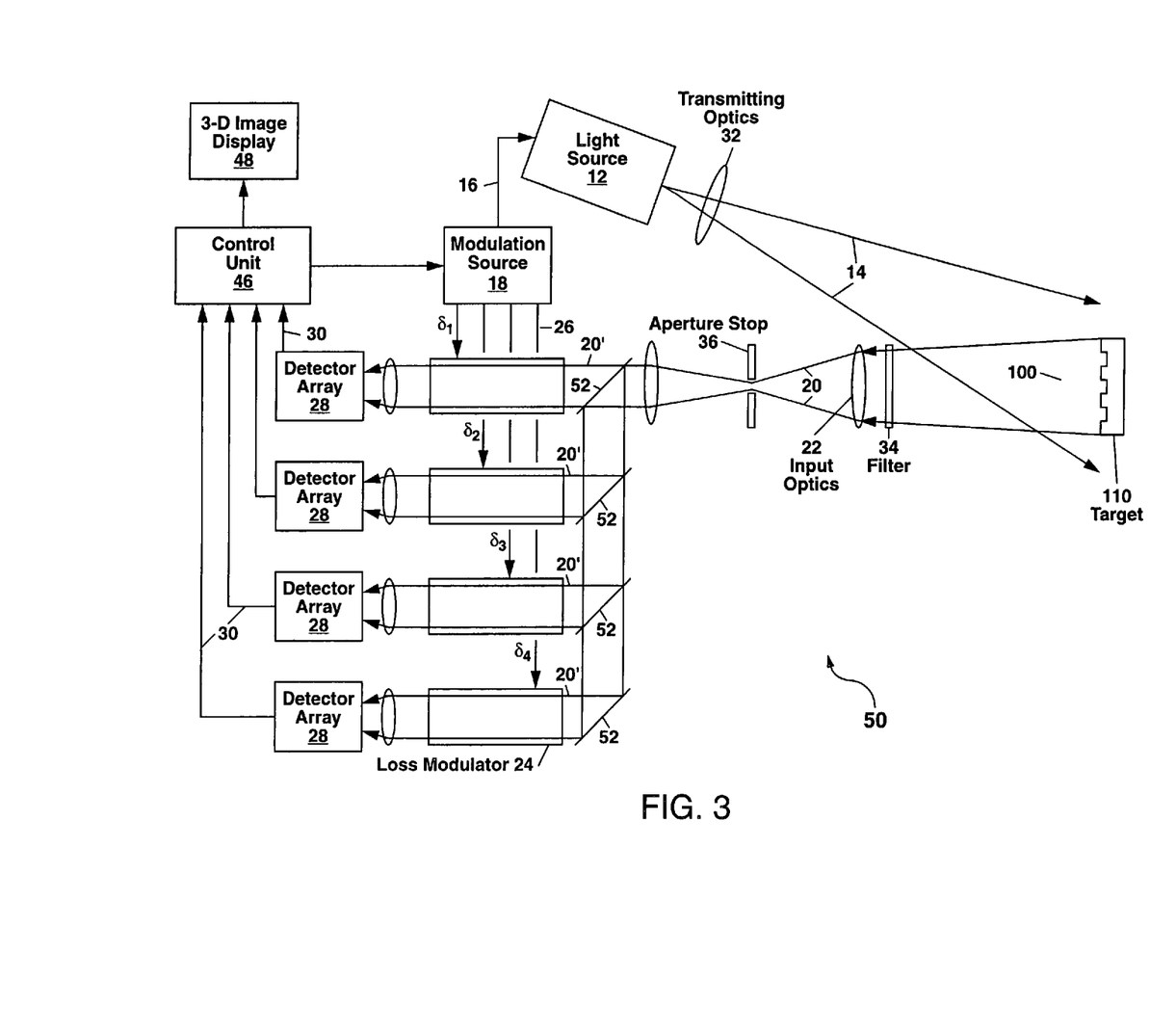
FIG. 3 shows a schematic diagram of a second example of the scannerless 3-D imaging apparatus of the present invention.

FIG. 3 shows a second example of a scannerless 3-D imaging apparatus 50 according to the present invention. The apparatus 50 in FIG. 3 is also termed a flash LADAR 50 since it is capable of obtaining a 3-D image of a target 110 within the field of view 100 in a very short time duration with the illuminating light beam 14 from the source 12 only being "flashed" for a short time (e.g. 20-200 μs). This effectively freezes any motion of the target 110 thereby allowing moving targets 110 to be imaged with greater resolution. Additionally, the flash LADAR 50 of the present invention reduces exposure to the illuminating light beam 14, which can be important when people are in the field of view, 100 since the illuminating light beam 14 need be turned "on" only once.

In the example of FIG. 3, a plurality of loss modulators 24 are provided in the apparatus 50 with each loss modulator 24 being sinusoidally modulated at the same frequency $f_0$ as the light source 12, but with a different phase delay $\delta_i$ given by the above equation. The backscattered light 20 is divided into a plurality of approximately equal-intensity light components 20' with beam splitting optics 52 (e.g. mirrors and/or polarization beamsplitters). Each light component 20' is then directed through a different loss modulators 24 to one of the detector arrays 28. The electrical output signal 30 from each detector array 28 is fed into the control unit 46 to construct the 3-D image of the target 110. This eliminates the need for sequential measurements for each phase delay $\delta_i$ thereby allowing the 3-D image to be obtained much faster and with only a single short-duration flash of the amplitude modulated cw light beam 14 from the source 12. Of course, additional measurements can be made with the flash LADAR 50, if needed, for signal averaging to improve the resolution of the target 110.

The scannerless 3-D imaging apparatus 10 of the present invention can be used for many different applications including vehicle collision avoidance, autonomous rendezvous and docking, robotic vision, industrial inspection and measurement, 3-D cameras, and facial recognition. The scannerless 3-D imaging apparatus 10 of the present invention can be made eye-safe for use in applications where people may be present within the field of view 100. Additionally, it avoids the time-consuming need for raster scanning a narrow light beam (e.g. from a laser) across a desired field of view. The scannerless 3-D imaging apparatus 10 of the present invention also eliminates the need for a mechanical beam scanner required by conventional raster-scanned 3-D imaging devices, thereby making the apparatus 10 of the present invention more compact and rugged, while allowing higher data rates.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A scannerless three-dimensional (3-D) imaging apparatus to provide a 3-D image of a target within a field of view, comprising:
a continuously-emitting light source which is amplitude modulated in response to a first sinusoidal modulation signal at a frequency $f_0$ to provide a non-scanned illumination of the field of view;
a loss modulator which is modulated at the same frequency $f_0$ in response to a second sinusoidal modulation signal having a variable phase delay with respect to the first sinusoidal modulation signal, with the loss modulator being adapted to receive light backscattered from the target within the field of view and to provide a loss in transmission through the loss modulator which is range dependent and phase-delay dependent; and
an array detector to detect the backscattered light transmitted through the loss modulator and generate therefrom an electrical output signal containing information wherefrom the 3-D image of the target can be constructed.

2. The apparatus of claim 1 wherein the frequency $f_0$ is in a range of 1 MHz to 10 GHz.

3. The apparatus of claim 1 further comprising an aperture stop for limiting an amount of the backscattered light received into the loss modulator.

4. The apparatus of claim 1 wherein the continuously-emitting light source comprises a laser.

5. The apparatus of claim 4 wherein the laser comprises a semiconductor laser.

6. The apparatus of claim 4 wherein the illumination from the laser is in an eye-safe wavelength region between 1.4 microns and 1.7 microns.

7. The apparatus of claim 1 wherein the array detector comprises a focal plane array (FPA) detector.

8. The apparatus of claim 7 wherein the FPA detector comprises an indium gallium arsenide FPA detector.

9. The apparatus of claim 1 wherein the array detector comprises a charge-coupled device (CCD) array detector.

10. The apparatus of claim 9 wherein the CCD array detector comprises a silicon CCD array detector.

11. The apparatus of claim 1 wherein the array detector comprises a complementary metal-oxide semiconductor (CMOS) array detector.

12. A scannerless three-dimensional (3-D) imaging apparatus to provide a 3-D image of a target within a field of view, comprising:
a continuously-emitting light source which is amplitude modulated in response to a first sinusoidal modulation signal at a frequency $f_0$ to provide a non-scanned illumination of the field of view;
a loss modulator which comprises a pair of crossed linear polarizers sandwiched about an electrooptic crystal modulator, with the loss modulator being modulated at the same frequency $f_0$ in response to a second sinusoidal modulation signal, and with the loss modulator being adapted to receive light backscattered from the target within the field of view and to provide a loss in transmission through the loss modulator which is range dependent and phase-delay dependent; and
an array detector to detect the backscattered light transmitted through the loss modulator and generate therefrom an electrical output signal containing information wherefrom the 3-D image of the target can be constructed.

13. The apparatus of claim 12 wherein the loss modulator further comprises a quarter-wave plate located between the pair of crossed linear polarizers.

14. The apparatus of claim 12 wherein the electrooptic modulator comprises an electrooptic crystal selected from the group consisting of lithium niobate ($LiNbO_3$), lithium tantalate ($LiTaO_3$), barium titanate ($BaTiO_3$), beta barium borate ($\beta$-$BaB_2O_4$), potassium dihydrogen phosphate (KDP), potassium titanyl phosphate (KTP), potassium niobate ($KNbO_3$), zinc selenide (ZnSe), gallium arsenide (GaAs), BGO ($Bi_{12}GeO_{20}$), and BSO ($Bi_{12}SiO_{20}$).

15. A scannerless three-dimensional (3-D) imaging apparatus to provide a 3-D image of a target within a field of view, comprising:
a continuously-emitting light source which is amplitude modulated in response to a sinusoidal modulation signal at a frequency $f_0$ to provide a non-scanned illumination of the field of view for a period of time;
a plurality of loss modulators which are each modulated at the same frequency $f_0$ with a different phase delay $\delta_i$ with respect to the sinusoidal modulation signal, with each loss modulator being adapted to receive a portion of backscattered light from the target and to provide a loss in transmission of that portion of the backscattered light which is dependent on a range to the target and also dependent on the phase-delay $\delta_i$; and
an array detector to detect the portion of the backscattered light transmitted through each loss modulator and to generate therefrom an electrical output signal containing information wherefrom the 3-D image of the target can be constructed.

16. The apparatus of claim 15 wherein the light source comprises a laser.

17. The apparatus of claim 16 wherein the laser comprises a semiconductor laser.

18. The apparatus of claim 16 wherein the illumination from the laser is at an eye-safe wavelength region between 1.4 and 1.7 microns.

19. A scannerless three-dimensional (3-D) imaging apparatus to provide a 3-D image of a target within a field of view, comprising:
   a continuously-emitting light source which is amplitude modulated in response to a sinusoidal modulation signal at a frequency $f_0$ to provide a non-scanned illumination of the field of view for a period of time:
   a plurality of loss modulators, with each loss modulator comprising a pair of crossed linear polarizers sandwiched about an electrooptic crystal modulator, and with each loss modulator being modulated at the same frequency $f_0$ with a different phase delay $\delta_i$ with respect to the sinusoidal modulation signal, and with each loss modulator being adapted to receive a portion of backscattered light from the target and to provide a loss in transmission of that portion of the backscattered light which is dependent on a range to the target and also dependent on the phase delay $\delta_i$; and
   an array detector to detect the portion of the backscattered light transmitted through each loss modulator and to generate therefrom an electrical output signal containing information wherefrom the 3-D image of the target can be constructed.

20. The apparatus of claim 19 wherein each loss modulator further comprises a quarter-wave plate located between the pair of crossed linear polarizers.

21. The apparatus of claim 15 wherein each array detector is selected from the group of array detectors consisting of charge-coupled device (CCD) array detectors, complementary metal-oxide semiconductor (CMOS) array detectors, and focal plane array (FPA) array detectors.

* * * * *